Dec. 8, 1936.　　　R. J. PRICE　　　2,063,754
ICE CREAM DIPPER
Filed June 4, 1935
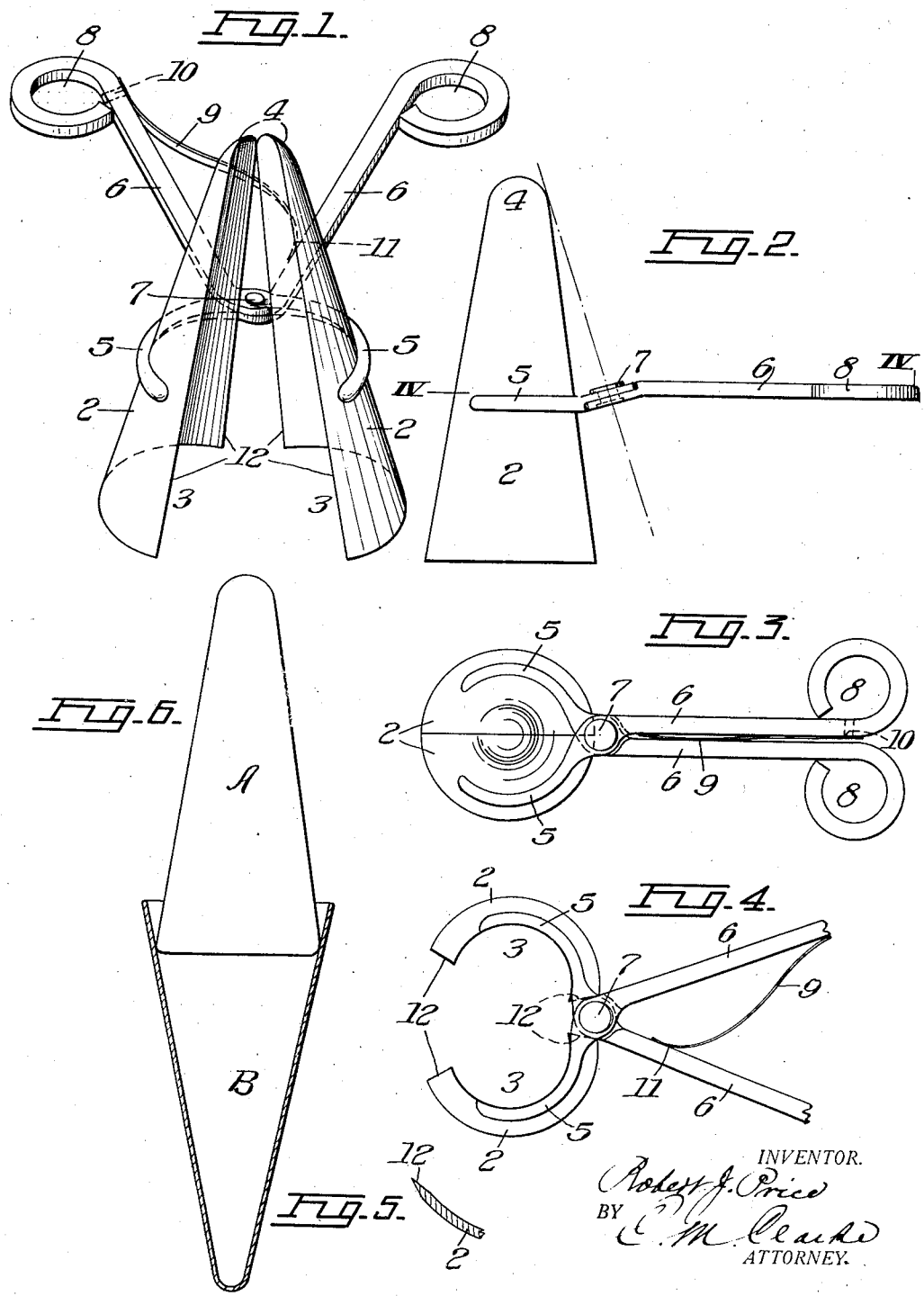

Patented Dec. 8, 1936

2,063,754

UNITED STATES PATENT OFFICE 2,063,754

ICE CREAM DIPPER

Robert J. Price, Uniontown, Pa.

Application June 4, 1935, Serial No. 24,863

3 Claims. (Cl. 107—48)

My invention consists of an improvement in ice cream dippers and formers, particularly adapted to the operation of removing and forming a cone shaped unit for placement in a supporting pastry cone for consumption. It has in view to provide a device of such character consisting of a pair of round bottom open top half-cones operatively connected by a pair of pivotally connected spring retracted handles, adapted to be used in the manner hereinafter described.

One preferred form of the invention is illustrated in the accompanying drawing, in which:

Fig. 1 is a perspective view of the dipper and former in open position;

Fig. 2 is a side elevation showing the sides of the dipper closed;

Fig. 3 is a plan view of Fig. 2;

Fig. 4 is a transverse section on the line IV—IV of Fig. 2, but showing the sides partly open;

Fig. 5 is an enlarged detail view showing the cutting edge of one of the sides;

Fig. 6 is a sectional view of a conventional pastry cone with the formed unit placed therein.

In the prevailing practice of vending ice cream in such cones they are filled or partly filled by scooping an indeterminate quantity of ice cream from a can or the like, and placing it in the cone, with more or less pressure and condensation, but with no certainty that the customer is receiving a full measure.

Another method in common use is to fill the upper portion only of the cone by use of a spoon or scoop and to form a pile above the top of the cone of indeterminate dimensions.

With either of such operations even approximate fair measurement is extremely doubtful, and undesirable condensation of the cream results.

Also, when the cream is inserted in the cone, filling or approximately filling it, and with spoon or scoop pressure, it becomes necessary to bite through the supporting cone clear to the bottom, with accompanying waste, dripping and smearing, especially when the cream softens from the temperature of the hand. This feature is especially objectionable during consumption of ice cream in cones by children.

In my invention I provide against all of these objections by the formation of a substantially exact measured quantity of cream, of uniform initial texture throughout. Also, by such formation, due to the construction of my improved dipper, a fully formed cone of normal initial consistency is formed, and inserted base down into the top of the pastry cone, and projects thereabove in easily available full measure and attractive form.

The main forming elements of the dipper comprise two similar semicone halves 2, 2, open at their bases as at 3 and terminating in semispherical or rounded tops 4. These are connected with the inner terminals 5 of a pair of operating handles or arms 6, 6, pivotally connected at 7 and having looped terminals 8 for finger and thumb grasping engagement. One of the handles has a separating spring 9 secured to it at 10 with its free terminal 11 bearing against the other arm, for normal separation of the halves 2.

The meeting edges 12 of each half cone 2 are sharpened, as in Fig. 5, facilitating separation of the desired portion of cream from the mass when used in the manner provided for.

The dipper is manipulated by the user, while open as in Fig. 1, by dipping it sidewise into the cream, one of the outer knife edges 12 slicing off just the proper amount sidewise, in an arcuate path. The opposite outer edge, when properly opened by spring action under control of the hand of the operator, defines an intervening entrance clearance just sufficient to admit the proper amount of cream sufficient to just fill the cavity when the sides are closed.

Such filling also will be uniform in content from one end to the other, due to the degree of tapering space between the outer edges being in exact proportion to the tapering cone shaped body finally enclosed, when the sides are then brought together as in Fig. 3. By such construction and operation the unit of cream is severed from the mass and formed into the final cream cone for delivery without any condensation, and of continuously uniform amount and finished shape.

Thereupon such formed unit A may be discharged, base down, into the extreme upper portion of the conventional pastry cone B, as in Fig. 6. As thus deposited the effect is not only pleasing, finished and attractive, but convincing as to its full measure integrity and value, with the additional feature of easy and satisfactory consumption. Practically the entire cream unit may be eaten without encroachment on any portion of the pastry cone, except perhaps the extreme top, and without liability to abnormal softening or dripping. This is because of its remoteness from temperature heating from the hand of the user.

The main advantage however is in a resulting cream unit of perfect uniform shape and size, and of normal consistency without compression and condensation.

Proper opening and closing action of the sides 2 to effect close relation of the rear edges 12, especially at the top, with ample spacing of the front cutting and space controlling edges, is effected by proportionate compensating inclination of the pivotal joint, as shown in Fig. 2. By such arrangement, the pivoting center or axis is disposed on a line intersecting the end wall at the top or smaller end of the dipper.

The construction and operation of the invention will be readily understood and appreciated by all those familiar with the vending and consumption of ice cream cones. It is easily and cheaply made, very efficient in operation without requiring any special skill in use, composed of few parts, and is readily maintained clean and sanitary by washing. It may be made of suitable pressed sheet material, as steel, aluminum, or any suitable alloy, or with appropriate plating as desired, and of any desired size and capacity.

What I claim is:

1. An ice cream dipper composed of a pair of open bottom semicones having rounded closing tops, the rear edge portions of which are in constant contact, at a point along said tops, and handles therefor pivoted to each other on an axis at a point spaced from the semicones and extending through the first mentioned point provided with an opening spring whereby the semicones may be partly opened to provide a limited tapering opening at their outer portions and a comparatively small tapered opening at their inner portions for side scooping.

2. An ice cream dipper composed of a pair of open bottom semicones having rounded closing tops, handles secured to the semicones and pivoted together on an axial center inclined to the longitudinal axis of the dipper and tangent to said tops, said handles being provided with an opening spring whereby the semicones may be partly opened to provide a limited tapering opening at their outer portions and a comparatively small tapered opening at their inner portions while maintaining closing contact of the inner edges of the rounded closing tops, for side scooping.

3. An ice cream dipper composed of a pair of dipping sections each open at the bottom and closed at the top, a handle secured to each of said sections, said handles being pivoted to each other at a point spaced from the sections and on an axis extending through a point at the closed top portions of the sections.

ROBERT J. PRICE.